United States Patent Office 3,106,543
Patented Oct. 8, 1963

3,106,543
REACTION PRODUCT OF AN ALKYLENE OXIDE-POLYVINYL ALCOHOL MIXTURE WITH UNTREATED POLYVINYL ALCOHOL
John N. Milne, Chesham Bois, England, assignor to E. I. du Pont de Nemours and Company, Wilmington, Del., a corporation of Delaware
No Drawing. Filed Apr. 12, 1960, Ser. No. 21,602
5 Claims. (Cl. 260—45.5)

This invention relates to novel and useful methods for preparing plasticized polyvinyl alcohol compositions which are not subject to loss of plasticizer through volatilization or migration and which retain their utility under conditions of varying humidities.

Films and shaped articles made from polyvinyl alcohol without the addition of plasticizer are of limited utility because of their relatively poor elongation, low flexibility and brittleness. Furthermore, owing to their variable content of water, which functions as a plasticizer, they are subject to wide variations in properties depending on the relative humidity of the atmosphere to which they are exposed. These shortcomings are overcome at present by the addition of plasticizers, of which glycerol is the most widely used. Other plasticizers used include ethylene glycol, the lower polyethylene glycols, ethanol acetamide, ethanol formamide, ethanolamine salts and many others. One of the most effective plasticizers is polyglycerol. However, all of the presently-used plasticizers suffer from one or more disadvantages such as excessive volatility, tendency to migrate or sweat, limited compatibility or high cost.

All of the commonly used plasticizers are believed to owe their plasticizing action largely to the fact that they function as humectants and the plasticized compositions are subject to wide variations in properties, tending to become brittle at low humidities, and excessively soft and tacky at high humidities.

Accordingly it is an object of this invention to provide plasticized hydroxyalkylated polyvinyl alcohols that retain high flexibility, but low brittleness and good elongation in atmospheres of varying degrees of humidity.

It is also an object to provide an improved process for making a plasticizer which will not migrate out of the composition, volatilize from it or otherwise be lost.

It is still another object of the present invention to provide cold water soluble films of plasticized polyvinyl alcohol.

Other objects will appear during the further discussion of the invention.

This invention comprises reacting an alkylene oxide, preferably ethylene oxide, with aqueous solutions of polyvinyl alcohol to produce hydroxyethylated polyvinyl alcohols. The resulting composition, which is believed to consist of hydroxyethyl polyvinyl alcohol together with ethylene glycol and polyethylene glycols, produced by reaction of the ethylene oxide with water, is used to plasticize untreated polyvinyl alcohol and may itself be used as self-plasticized modified polyvinyl alcohol. Films cast from the resulting compositions are highly plasticized and retain their utility over a wide range of relative humidities.

The reaction between ethylene oxide and polyvinyl alcohol can also be carried out in the absence of water, but the products so obtained are considerably less desirable than those made in aqueous solution.

In the absence of sufficient water, which acts as a mutual solvent for polyvinyl alcohol and ethylene oxide, a heterogeneous reaction mixture is obtained. This leads to a nonuniform and more colored reaction product which is generally less useful than that obtained from reaction in a homogeneous phase, i.e., in water in which both components are dissolved. Heat transfer through the pasty mixture which results when ethylene oxide is mixed with polyvinyl alcohol, in the absence of added or in the presence of insufficient water, is poor because of the high viscosity of the mixture. If heat is applied to accelerate the reaction, this generally leads to local overheating of the polyvinyl alcohol with consequent insolubilization and serious discoloration of the polymer. Furthermore, in the absence of sufficient water the high vapor pressure of ethylene oxide necessitates that the reaction be carried out in costly and unwieldy pressure vessels or else that gaseous ethylene oxide be used or that the reaction temperature be maintained below the boiling point of ethylene oxide.

The presence of adequate amounts of water not only provides a homogeneous reaction medium but lowers the vapor pressure of the ethylene oxide so that only moderate pressures are required. Useful and commercially practical rates of reaction may be obtained by bubbling ethylene oxide gas through the hot aqueous solutions at atmospheric pressure. This is particularly useful in cases where aqueous solutions of polyvinyl alcohol are prepared as a stage in the manufacture of the desired end product, for example, film. The conventional dissolving kettles which are normally designed for atmospheric or moderate pressure operation may then be used without major modification for the manufacture of the hydroxyethylated polyvinyl alcohol which is to be used as a plasticizer.

Alkaline catalysts, such as sodium hydroxide, may be added but are not normally necessary. The reaction may be carried out over a wide range of temperatures and pressures, the preferred temperature range being from 10 to 150° C. and the preferred pressure range from 1 to 50 atmospheres. The proportion of ethylene oxide used may vary between 1 and 200% of the weight of polyvinyl alcohol, a preferred procedure being to use from 10 to 100% by weight of ethylene oxide based on the weight of polyvinyl alcohol and to mix the reaction product with a further quantity of polyvinyl alcohol so that the final composition contains from 5 to 50% by weight of chemically combined ethylene oxide based on the total weight of polyvinyl alcohol used.

The hydroxyalkylated polyvinyl alcohol can be prepared using an alkylene oxide having 2 to 5 carbon atoms and partially or completely hydrolyzed polyvinylacetates of varying viscosities to yield a cold water soluble plasticizer or self-plasticized modified polyvinyl alcohol. A partially hydrolyzed polyvinylacetate is about 87 to 89% hydrolyzed; a completely hydrolyzed polyvinylacetate is about 98 to 100% hydrolyzed.

Preparation of a cold water-soluble film-forming mixture of polyvinyl alcohol and hydroxyalkylated polyvinyl alcohol is carried out by first forming the hydroxyalkylated polyvinyl alcohol and thereafter adding a partially hydrolyzed polyvinylacetate and then casting a film from the mixture. If a less water-sensitive film is desired, a completely hydrolyzed polyvinylacetate is added to the hydroxyalkylated polyvinyl alcohol. Cold water-soluble films are particularly useful in those applications where preweighed quantities of soap, bluing, disinfectants and the like are to be added to water without the necessity of breaking or removing the wrappers. These cold water soluble films are preferred films of the present invention.

EXAMPLE 1

A mixture of 44 g. of polyvinyl alcohol having a 4% aqueous solution viscosity in the range of 4 to 6 cp. at 20° C. and a degree of hydrolysis in the range of 98.5 to 100% and 88 g. of ethylene oxide was charged to a stainless steel autoclave. The autoclave was purged with nitrogen and heated for 30 hours at a temperature of 70 to 100° C. as measured by a thermocouple immersed in the reaction mixture. Because of the poor thermal conductivity of the semi-solid mixture, it is probable that the temperature at the wall of the vessel was significantly higher than those recorded. The product of the reaction was a rubbery, orange-colored mass. It was shredded under methanol, centrifuged, and the methanol insoluble portion dried first at room temperature and finally at 105° C. The resulting product was light brown in color, rubbery in texture, and insoluble in water. The weight of the methanol and water-insoluble fraction was 78 g. In contrast the product of Example 3 in which the same grade of polyvinyl alcohol and ethylene oxide were reacted in aqueous solution under similar conditions, was substantially free from water-insoluble matter.

EXAMPLE 2

Twenty grams of polyvinyl alcohol having a 4% solution viscosity in the range 28 to 32 cp. at 20° C. and a degree of hydrolysis of 99 to 100% was dissolved in 180 g. of water by heating at 95° C. with stirring. The resulting solution was stirred at 95° C. under reflux while a stream of gaseous ethylene oxide was bubbled in. After 5 hours, the gain in weight was 8 g., equivalent to 40% of the initial weight of polyvinyl alcohol.

A film cast from the resulting solution was soft, flexible and well plasticized.

EXAMPLE 3

Thirty grams of a 20% aqueous solution of polyvinyl alcohol having a 4% aqueous solution viscosity in the range 4 to 6 cp. at 20° C. and a degree of hydrolysis in the range 98.5 to 100% was scaled in a stainless steel bomb with 6 g. of ethylene oxide and the mixture was heated for 4 hours at 95° C.

The resulting product was poured into 250 ml. of methanol with vigorous agitation and the precipitated polymer washed with a further 250 ml. of methanol. The yield of precipitated polymer after drying to constant weight was 5.2 g. The product was yellow in color and fairly flexible.

Evaporation of the combined methanol extract yielded 5.5 g. of a clear, yellow, gelatinous mass. The methanol soluble and methanol insoluble fractions were recombined in aqueous solution and a film cast from the resulting dope. The film was clear, flexible and well plasticized. For comparative purposes, a second film was cast from an aqueous solution of the same batch of polyvinyl alcohol, plasticized by the addition of 50% by weight of polyglycerol based on the weight of polyvinyl alcohol.

Packages containing the detergent, Tide, were fabricated from each of the two films. Tide is a commercially available, all purpose, anionic type detergent. The packages had a capacity of about 15 gm. Detergent packages and samples of the two films were exposed to an atmosphere of 0% humidity for a period of two weeks and at the end of this time were examined. The film and detergent package plasticized by the ethylene oxide treatment while not as soft and flexible as those plasticized with polyglycerol had, nevertheless, retained a useful degree of flexibility and had none of the unpleasant greasy-feel characteristic of the polyglycerol plasticized samples.

EXAMPLE 4

The previous example (Example 3) was repeated using 30 g. of a 20% aqueous solution of polyvinyl alcohol having a 4% aqueous solution viscosity in the range 4 to 6 cp. at 20° C. and a degree of hydrolysis in the range 87.5 to 89%, and 6 g. ethylene oxide. The period of heating was 4½ hours at 95° C.

A film cast from the resulting solution was clear, soft, flexible and somewhat tacky. (Film No. 1.)

The above was repeated with the addition of 1 ml. of N/1 sodium hydroxide to the initial charge. The product was neutralized by the addition of acetic acid and mixed with a further 6 g. of the same batch of polyvinyl alcohol plus sufficient water to give a final solution weight of 60 g. The resulting mixture was heated with stirring to complete solution of the polyvinyl alcohol and 1 ml. of a 1% aqueous solution of the wetting agent, Triton X-100, added. Triton X-100 is an alkyl aryl polyether alcohol type wetting agent. The purpose of the latter is to assist band release after film casting. A film cast from the resulting mixture was clear, flexible and only slightly tacky (film No. 2).

For purposes of comparison, an unplasticized film and films containing conventional plasticizers were prepared from the same batch of polyvinyl alcohol. The plasticizer content in each case was 50% by weight of the polyvinyl alcohol. Triton X-100 (0.1% based on the weight of polyvinyl alcohol) was added to all films as a band release agent.

| Film No.: | Plasticizer |
|---|---|
| 3 | None. |
| 4 | Polyglycerol. |
| 5 | Polyethylene glycol. |
| 6 | Glycerol. |

Detergent packages containing Tide were fabricated from all film except No. 1. Samples of film and detergent packages were exposed to atmospheres of 0% and 100% relative humidity for 10 days. At the end of that time, they were examined and found to be in the following condition.

*0% Relative Humidity*

| Film No. | Film | Detergent Package |
|---|---|---|
| 1 | Very soft and flexible, no sweating. | |
| 2 | Soft, flexible, no sweating | Still flexible, no sweating. |
| 3 | Dry, brittle | Very dry and brittle. |
| 4 | Soft, flexible, sweating | Soft, flexible, slight sweating. |
| 5 | Soft, flexible, much sweating | Flexible, slight sweating. |
| 6 | Soft, flexible, sweating | Do. |

*100% Relative Humidity*

| Film No. | Film | Detergent Package |
|---|---|---|
| 1 | Disintegrated | |
| 2 | Very limp and sticky | Very limp, flexible, no sweating. |
| 3 | Very soft, flexible | Very soft, flexible. |
| 4 | Very limp and sticky | Limp and wet. |
| 5 | Very limp, sweating | Very soft, sweating slightly. |
| 6 | do | Limp and wet. |

It will be noted that the film cast from a mixture of partially hydrolyzed polyvinylacetate and the polyvinyl alcohol ethylene oxide reaction porduct (film No. 2) has superior over-all properties as regards flexibility, combined with absence of sweating at both high and low humidity. Even in the absence of polyvinyl alcohol diluent, the polyvinyl alcohol ethylene oxide reaction product (film No. 1) is characterized by low sweating combined with high water sensitivity both of which are desirable properties for application in the field of water-soluble packaging media. Sweating is surface exudation of plasticizer characterized by a moist and unpleasant feel.

EXAMPLE 5

An aqueous solution of polyvinyl alcohol ethylene oxide reaction product was prepared by the procedure given in Example 4 for the preparation of film No. 1. The resulting solution was evaporated and the residue dried to constant weight in an air oven at 105° C. A tough, opalescent, flexible, plasticized mass was obtained which weighed 33% more than the weight of polyvinyl alcohol initially used.

The above examples relate to the use of ethylene oxide for preparing hydroxyethylated polyvinyl alcohols for plasticizing polyvinyl alcohols but other alkylene oxides, such as propylene oxide and butylene oxides, may be used to prepare the corresponding hydroxyalkylated polyvinyl alcohols which are equally suitable as plasticizers for polyvinyl alcohols. Thus, hydroxypropylpolyvinyl alcohols and hydroxybutylpolyvinyl alcohols can be used effectively as nonvolatile and nonmigratory plasticizers for polyvinyl alcohol compositions. For the purposes of the present invention alkylene oxides containing not more than five carbon atoms are suitable.

To secure a good product it is necessary that the polyvinyl alcohol undergoing alkylenation should be completely dissolved in water such that the viscosity will be such as to permit easy heating and conductance of the heat throughout the reaction mixture. For such purposes I have found that the aqueous solution should contain not over about 30% by weight of polyvinyl alcohol and not much less than about 70% by weight of water. There is no lower limit of the amount of polyvinyl alcohol in the solution, but for practical purposes it will be generally uneconomical to operate with less than about 5% polyvinyl alcohol in water. The preferred range is between about 10% and 30% polyvinyl alcohol and 90% to 70% of water, all by weight.

Alkylene oxide can be added to the aqueous solution of polyvinyl alcohol as specified above without any other change in the proportion of water in the mixture. In general, the amount of alkylene oxide in the reaction mixture will not be much less than about 10% by weight related to the polyvinyl alcohol. If desired, the alkylene oxide may be increased to 100% or 200% based on the polyvinyl alcohol. In general the speed of the reaction will increase as the alkylene oxide concentration increases.

Throughout the specification and claims, parts and percentages are expressed by weight unless indicated otherwise.

This application is a continuation-in-part of my copending application filed July 16, 1956, Serial No. 597,882, now abandoned, which is a continuation-in-part of my application Serial No. 437,276, filed June 16, 1954, now abandoned.

I claim:

1. A method for producing a film-forming mixture comprising the step of reacting at 10° to 150° C. an alkylene oxide having 2 to 5 carbon atoms with an aqueous solution containing 5 to 30% by weight dissolved polyvinyl alcohol in the ratio of 0.01 to 2 parts by weight of said oxide for each part by weight of dissolved polyvinyl alcohol, and the step of mixing with said reaction medium sufficient untreated polyvinyl alcohol to reduce the amount of combined alkylene oxide to 5 to 50% by weight based on the total amount of polyvinyl alcohol used.

2. A method for producing a film-forming mixture comprising the step of reacting at 10° to 150° C. ethylene oxide with an aqueous solution containing 5 to 30% by weight dissolved polyvinyl alcohol in the ratio of 0.1 to 1 part by weight of said oxide for each part by weight of dissolved polyvinyl alcohol and the step of mixing with said reaction medium sufficient untreated polyvinyl alcohol to reduce the amount of combined ethylene oxide to 5 to 50% by weight based on the total amount of polyvinyl alcohol used.

3. The method of claim 1 wherein the alkylene oxide is ethylene oxide.

4. The method of claim 2 wherein the additional polyvinyl alcohol added to the reaction product is partially hydrolyzed polyvinylacetate.

5. A cold water soluble film cast from a mixture of partially hydrolyzed polyvinylacetate and a hydroxyethylated polyvinyl alcohol containing plasticizer formed by reacting at 10 to 150° C. an alkylene oxide having 2 to 5 carbon atoms with an aqueous solution containing 5 to 30% by weight dissolved polyvinyl alcohol in the ratio of 0.01 to 2 parts by weight of said oxide for each part by weight of dissolved polyvinyl alcohol; wherein the amount of combined ethylene oxide is 5–50% by weight of the polyvinyl alcohol present in said mixture.

References Cited in the file of this patent

UNITED STATES PATENTS

| | | |
|---|---|---|
| 1,971,662 | Schmidt | Aug. 28, 1934 |
| 2,844,570 | Broderick | July 22, 1958 |
| 2,874,023 | Walter | Feb. 17, 1959 |

FOREIGN PATENTS

| | | |
|---|---|---|
| 368,530 | Great Britain | Mar. 10, 1932 |